United States Patent [19]

Bücken et al.

[11] 4,226,945
[45] Oct. 7, 1980

[54] RUBBER COMPOSITIONS EXPANSIBLE UNDER VULCANIZATION CONDITIONS

[75] Inventors: Hans J. Bücken, Monheim-Baumberg; Helmut Horskorte, Monheim, both of Fed. Rep. of Germany

[73] Assignee: Henkel Kommanditgesellschaft auf Aktien, Dusseldorf-Holthausen, Fed. Rep. of Germany

[21] Appl. No.: 64,356

[22] Filed: Aug. 7, 1979

Related U.S. Application Data

[63] Continuation of Ser. No. 883,684, Mar. 6, 1978, abandoned.

[30] Foreign Application Priority Data

Mar. 5, 1977 [DE] Fed. Rep. of Germany ....... 2709622

[51] Int. Cl.$^2$ ............................................. C08J 9/08
[52] U.S. Cl. ........................................ 521/92; 521/97; 521/139; 521/140; 521/148; 521/150
[58] Field of Search ................... 521/92, 97, 148, 150, 521/139, 140

[56] References Cited

U.S. PATENT DOCUMENTS

| | | | |
|---|---|---|---|
| 2,621,161 | 12/1952 | Kulp et al. | 260/2.5 HB |
| 2,634,243 | 4/1953 | Glenn | 260/2.5 HB |
| 2,658,876 | 11/1953 | Reynolds | 260/2.5 HB |
| 2,668,152 | 2/1954 | O'Neal | 260/2.5 HB |
| 3,812,225 | 5/1975 | Hosoda et al. | 260/2.5 HB |
| 3,846,350 | 11/1974 | Schentger | 260/2.5 HB |

*Primary Examiner*—Morton Foelak
*Attorney, Agent, or Firm*—Hammond & Littell, Weissenberger and Muserlian

[57] ABSTRACT

A rubber composition, expansible under vulcanization conditions consisting of at least one vulcanizable synthetic rubber, vulcanizing agents and a propellant gas donor under vulcanizing conditions consisting of
(a) from 100 to 900 parts by weight, based on 100 parts by weight of said synthetic rubber, of natural, non-pretreated chalk, and
(b) from 5 to 120 parts by weight, based on 100 parts by weight of said synthetic rubber, of at least one natural or synthetic fatty acid having from 12 to 22 carbon atoms.

6 Claims, No Drawings

4,226,945

RUBBER COMPOSITIONS EXPANSIBLE UNDER VULCANIZATION CONDITIONS

This is a continuation of Ser. No. 883,684, filed Mar. 6, 1978, now abandoned.

BACKGROUND OF THE INVENTION

Rubber compositions which are expansible under vulcanization conditions have been known in the prior art for a long time. They are used predominantly in the construction of vehicle bodies and are intended to interconnect various parts of a vehicle body so as to fill the gaps therebetween. For this purpose, it is necessary that the inserted strips should expand to a considerable extent during the stoving of the lacquer and at the same time should unite satisfactorily with the surface. A further requirement is that the finished, expanded strips should have a low water-absorption capacity and should effect a rigid connection between the workpieces and should be resistant to under-rusting and thus do not cause corrosion.

The propellant gas hitherto used for these vulcanizing rubber compositions was usually nitrogen and carbon dioxide, with azobutyric acid dinitrile, azodicarbamite disulfohydrazides, sodium hydrogen carbonate, or, alternatively, dinitroso compounds being used as the gas-developing substances.

However, it has transpired that optimum results could not be obtained with the known propellant gas substances.

OBJECTS OF THE INVENTION

An object of the present invention is to provide a system which exhibits improved propellant gas properties and at the same time has an improved action with respect to the connection of the two materials of the workpieces and an anti-corrosion property.

Another object of the present invention is the development of a rubber composition, expansible under vulcanization conditions consisting of at least one vulcanizable synthetic rubber, vulcanizing agents and a propellant gas donor under vulcanizing conditions consisting of (a) from 100 to 900 parts by weight, based on 100 parts by weight of said synthetic rubber, of natural, non-pretreated chalk, and (b) from 5 to 120 parts by weight, based on 100 parts by weight of said synthetic rubber, of at least one natural or synthetic fatty acid having from 12 to 22 carbon atoms.

These and other objects of the invention will become more apparent as the description thereof proceeds.

DESCRIPTION OF THE INVENTION

In accordance with the present invention, propellant gas donors used for rubber compositions expansible under vulcanization conditions are those which comprise (a) natural non-pretreated chalk in a quantity of 900 to 100 parts by weight, and (b) natural or synthetic fatty acids having a chain length of from 12 to 22 carbon atoms in a quantity of 120 to 5 parts by weight, relative to 100 parts by weight of rubber in each case.

More particularly, therefore, the present invention relates to a rubber composition, expansible under vulcanization conditions consisting of at least one vulcanizable synthetic rubber, vulcanizing agents and a propellant gas donor under vulcanizing conditions consisting of (a) from 100 to 900 parts by weight, based on 100 parts by weight of said synthetic rubber, of natural, non-pretreated chalk, and (b) from 5 to 120 parts by weight, based on 100 parts by weight of said synthetic rubber, of at least one natural or synthetic fatty acid having from 12 to 22 carbon atoms.

Any further auxiliary substances, for example conventional auxiliary substances, present in a minor quantity are not taken into account in the above formulation. Suitable types of rubber capable of vulcanization are the conventional types of synthetic rubber such as styrene/butadiene rubber, polybutadiene rubber butyl rubber, polychloroprene and nitrile rubber. Preferably, however, polybutadiene/styrene rubber, polybutadiene rubber, or butyl rubber are used. The fatty acids used are preferably the saturated fatty acids, particularly those having a chain length of from 14 to 18 carbon atoms. Alternatively, unsaturated fatty acids, such as oleic acids, may be jointly used in minor quantities, although their proportion should not exceed more than approximately 30% to 40% of the saturated fatty acids.

The preferred type of chalk is the particularly fine-grain Champagne chalk which can be used in a dried or natural form. Advantageously, commercial products are used which have a grain diameter of approximately 0.1 to 15μ. Alternatively, it is also possible to use other types of chalk such as those quarried in, for example, Dover in England or in Sweden or Germany. They have an external amorphous appearance, although they constitute a cryptocrystalline calcite. When using these types of chalk, care has to be taken that impurities are not present which impair the expansion behavior or the adhesion of the sealing strips to the steel members.

In addition to the constituents in accordance with the present invention which have been mentioned, the expansible rubber compositions in accordance with the present invention may also contain fillers such as zinc oxide, possibly small quantities of talc and the like as well as mineral oils and adhesive resins. Suitable adhesive resins include, for example, the phenolic resins such as phenol/formaldehyde resins. Furthermore, auxiliary agents which may be mentioned are the conventional accelerators or plasticizers by means of which the vulcanization behavior may be influenced in a suitable form.

Further propellants, such as azoisobutyric acid dinitrile or sodium hydrogen carbonate which are frequently used, should not be added to the rubber composition in accordance with the present invention. In these cases, the water-absorption capacity of the expanded strips is influenced in an unfavorable manner.

In addition to the other desired favorable characteristics, the expanded strips in accordance with the present invention are distinguished by the fact that the propelling action of the mixture comprising calcium carbonate and fatty acids commences only at approximately 100° C., while the other known propellants in known expansible rubber compositions of this type develop their action at approximately 70° to 75° C. The higher temperature propelling action has a favorable effect on the connection between the expanded rubber composition and the metal parts to be connected.

The volume expansion of the rubber compositions in accordance with the present invention lies between approximately 50 to 120% and, in the type of rubber, is dependent upon the chemical composition used and the temperature control. Under-rusting phenomena on metal surfaces are largely avoided when using the rubber compositions in accordance with the present invention, since rubber-sponge-like, fine-foaming materials are obtained which have an interior closed surface (closed cells).

The present invention will now be further illustrated by way of the following Example, which is not limitative of the invention in any respect.

EXAMPLE

The following constituents were intimately mixed in a kneader:

78.0 parts by weight of styrene/butadiene rubber
32.0 parts by weight of polybutadiene rubber
18.0 parts by weight of mineral oil
5.3 parts by weight of carbon black (Raven 1170)
16.3 parts by weight of phenolic resin (Resole type)
9.5 parts by weight of sodium benzoate
19.0 parts by weight of polybutadiene block polymer (polymeric plasticizer)
5.3 parts by weight of zinc oxide
12.6 parts by weight of sulfur
6.3 parts by weight of dibenzothiazyl disulfide
560.0 parts by weight of natural chalk (commercial product from Champagne, very fine grained)
12.7 parts by weight of stearic acid This composition was applied in strips directly to steel sheets on the one hand (a), and, on the other hand, after passing through a manual extruder (b).

The temperature of the coated steel strips was then increased to 160° C. over a period of 30 minutes. The actual expansion operation commenced at an object temperature of approximately 110° C. The penetration at 20° C., in accordance with ASTM, of the non-vulcanized compound was 92. After vulcanization, the volume expansion was determined and the water-absorption capacity after storage in cold water was ascertained in accordance with DIN 53 495 C.

Volume expansion: (a) 73.9 (b) 61.0
Water absorption: (a) 0.5 (b) 0.2

Furthermore, the condensed moisture was determined on 12 mm round extrudates in accordance with DIN 50017 SK and showed values between 1.6 and 2.3, while under-rusting was not observed during 10 days in a spray test in accordance with DIN 50021 SS.

The preceding specific embodiment is illustrative of the practice of the invention. It is to be understood, however, that other expedients known to those skilled in the art or disclosed herein, may be employed without departing from the spirit of the invention or the scope of the appended claims.

We claim:

1. A rubber composition, expansible under vulcanization conditions consisting of at least one vulcanizable synthetic rubber selected from the group consisting of styrene/butadiene rubber, polybutadiene rubber, and mixtures thereof, vulcanizing agents and a propellant gas donor under vulcanizing conditions in the absence of azobutyric acid dinitrile and sodium hydrogen carbonate, consisting of a mixture of
    (a) from 100 to 900 parts by weight, based on 100 parts by weight of said synthetic rubber, of natural, non-pretreated chalk, and
    (b) from 5 to 120 parts by weight, based on 100 parts by weight of said synthetic rubber, of at least one natural fatty acid having from 14 to 18 carbon atoms and containing at least 60% of saturated acids, as the sole blowing agent.

2. The rubber composition of claim 1 wherein said natural fatty acids are saturated.

3. The rubber composition of claim 1 wherein said at least one fatty acid is stearic acid.

4. The rubber composition of claim 1 wherein said natural, non-pretreated chalk has a grain diameter of from 0.1 to 15μ.

5. The rubber composition of claim 1 having a further content of a filler.

6. The rubber composition of claim 1 having a further content of an adhesive resin.

* * * * *